June 14, 1927.
E. E. NEWTON
GRID WINDING MACHINE
Filed Aug. 26, 1925
1,632,095
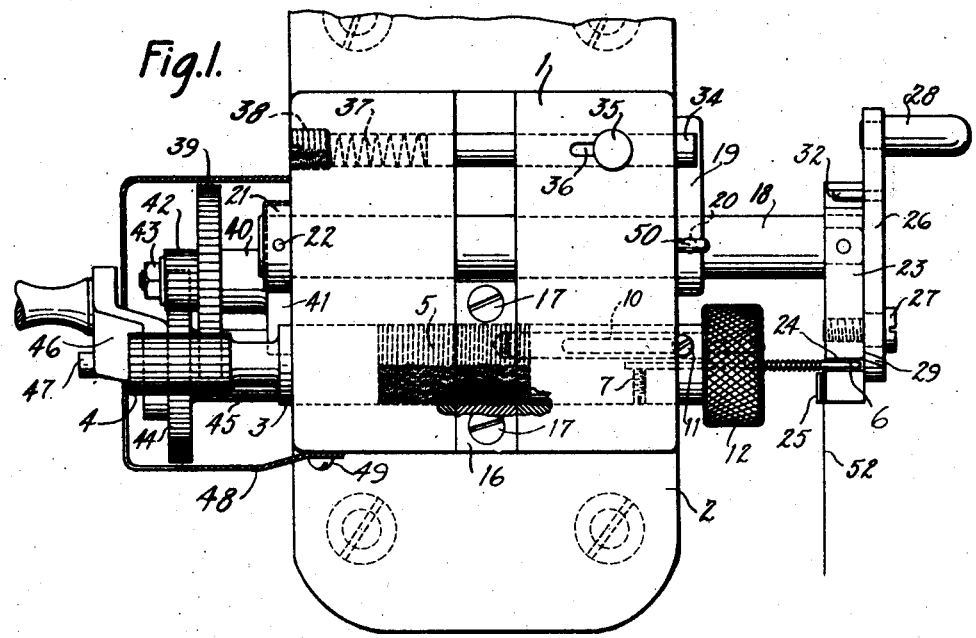
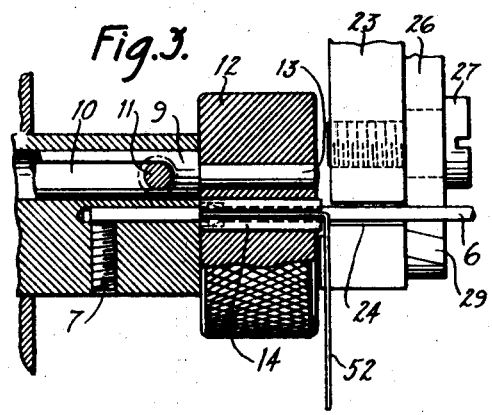
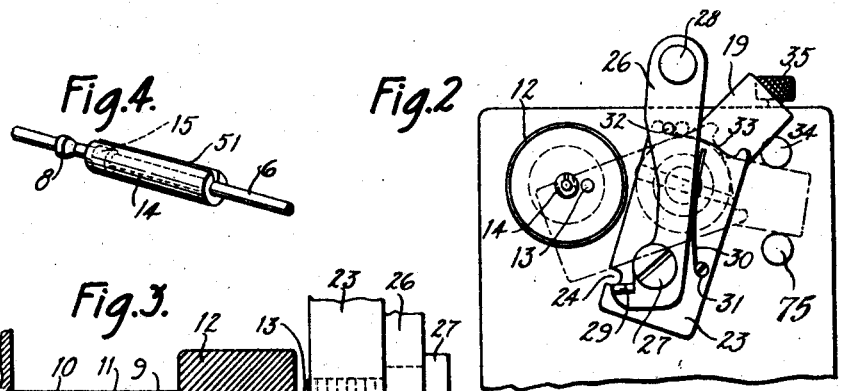
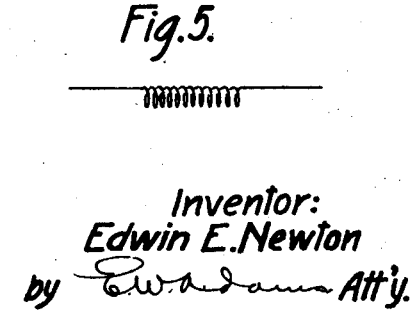
Inventor:
Edwin E. Newton
by ⎯⎯⎯ Att'y.

Patented June 14, 1927.

1,632,095

UNITED STATES PATENT OFFICE.

EDWIN E. NEWTON, OF MONTREAL, QUEBEC, CANADA, ASSIGNOR TO WESTERN ELECTRIC COMPANY, INCORPORATED, OF NEW YORK, N. Y., A CORPORATION OF NEW YORK.

GRID-WINDING MACHINE.

Application filed August 26, 1925. Serial No. 52,564.

This invention relates to winding machines, and has for an object the forming of helical grid electrodes for electron discharge devices.

This object is attained by providing a rotating and reciprocating mandrel having means to receive axially the end of the wire from which the grid is to be made. After the wire has been received within this means, the mandrel is rotated and moved axially to wind the wire helically thereon. When the wire has been wound on the mandrel to form the grid, the wire is bent axially of the mandrel and cut; the mandrel rotated in the opposite direction and moved axially back to its original position and the grid removed. This arrangement winds a helical electrode in the form in which it may be assembled in a discharge device without further adjustment and provides wire extensions at each end of the helix to support the electrode in the device.

Referring to the drawings, Fig. 1 is a plan view of the machine made in accordance with this invention. Fig. 2 is a partial end view showing the swinging guide member. Fig. 3 is an enlarged detail of the shaft and mandrel. Fig. 4 shows in perspective the mandrel and sleeve member, and Fig. 5 illustrates a helical wire grid in its completed form.

The grid winding machine comprises a rectangular casing 1, preferably of cast metal, such as iron or brass, and a base portion 2, whereby the machine may be attached to a work bench or table. A cylindrical main channel is provided in the upper fore part of the casing to receive the cylindrical shaft 3 which is provided with an integral gear 4 of relatively wide dimensions. Intermediate the ends of the shaft 3 is a threaded portion 5, the number of threads and the pitch thereof being determined according to the spacing and length of the grid wire to be wound. A cylindrical mandrel 6 is located in the other end of the shaft 3 and is rigidly held therein by means of a set screw 7. The mandrel is provided with a conical shoulder 8 the base of which abuts against the face of the shaft and while it forms a limiting means for the movement of the mandrel within the shaft, it has other purposes to be hereinafter described. An eccentric tubular opening in the shaft adjacent the mandrel forms a sleeve for a sliding pin 9 which is provided with a groove 10 of a predetermined length. A set screw 11 passing through the shaft engages the slot 10 to limit the movement of the pin 9 in the shaft. A cylindrical chuck 12 which surrounds the mandrel 6 is rigidly attached to an extension 13 on the pin 9. Located within the chuck 12 is a split sleeve 14 which is fitted tightly in the chuck and is slidable on the mandrel 6. The end of the sleeve adjacent the conical shoulder 8 on the mandrel is provided with a countersunk portion 15, to fit over the conical shoulder 8. A removable block 16, preferably of steel, is fitted into the upper part of the casing intermediate its ends, and is provided with a threaded surface to engage the threaded portion 5 of the shaft. This block is fastened to the casing by means of screws 17.

A similar channel having its axis in the same plane as the axis of the shaft 3, extends through the casing and forms a bearing for the cylindrical shaft 18. The extent of rotation of this shaft is determined by the arm 19 which is rigidly attached thereto by means of a pin 20. The arm 19 abuts on one surface of the casing while a cylindrical collar 21 rigidly attached to the other end of the shaft by means of pin 22, abuts on the other surface of the casing, thereby preventing any longitudinal movement of the shaft 18. The shaft 18 extends for a distance beyond the casing on one side thereof and carries at its end a metal plate 23. This plate is provided with a groove 24 near one end and surrounds the free end of the mandrel 6. A grooved extension 25 on the inner surface of the plate adjacent the chuck 12 provides guiding means for the wire to be wound. A cutting knife 26 is attached to the plate 23, by means of a screw 27, which also acts as a fulcrum. A handle 28 attached to one end of the cutting arrangement 26 provides the leverage to advance the knife edge 29 across the groove 24. A wire spring 30 having one end attached to the plate 23 and 31 and the other end pressing against the lower surface of the cutting arrangement provides the necessary means for returning the knife to its normal position. A pin 32 carried by the arm 26 slides over a curved portion 33 on the plate 23, to provide the proper tensioning to the knife edge. A stop pin 34 slidably located in the casing in the upper rear corner thereof, is provided with a knob 35 which moves in a slot 36 in the casing. A spring 37 and a threaded stud 38 provide the necessary force to hold the pin 34 in its locking position.

The sliding gear 4 is engaged by a large diameter spur gear 39 which is carried on the shaft 40 projecting from the plate 41 attached to the slide of the casing. A pinion gear 42 rotates in unison with the gear 39, the two gears having a working fit on the stationary shaft and are held thereon by means of a nut 43. A spur gear 44 rotates on a stationary shaft 45 extending from the casing and engages the pinion gear 42. The gear 44 is rigidly attached to an operating handle 46 whereby one complete revolution of the handle and gear 44 imparts motion to the sliding gear 4, and this gear rotates and reciprocates the shaft at a rapid rate with respect to the movement of the operating handle. A stopping rod 47 projects from the casing and limits the movement of the operating handle to a single revolution in either direction. A protective casing 48 encloses the train of gears and is attached to the casing by means of screws 49.

The operation of the machine is as follows:

The operating handle 46 is rotated in a clockwise direction to advance the shaft 3, chuck 12 and mandrel 6 to a position shown in Fig. 3. This is accomplished by one complete turn of the operating handle through the medium of the reduction gearing. In this position the locking pin 34 is released by drawing back the knob 35 and the guiding and cutting arrangement swings downwardly, thereby raising the arm 19 until it comes in contact with pin 50 on the casing. This operation removes the mechanism attached to shaft 18 out of the direct line of the mandrel 6, thereby allowing ample space for the operator to adjust the wire to the mandrel. The chuck 12 and sleeve 14 are pulled out on the mandrel and come to a definite stop determined by the set screw 11 engaging a shoulder on the sliding pin 9. In this condition the machine is ready for the wire to be wound. A length of wire is inserted in the slot 51 of the sleeve 14, within the chuck 12 and is moved forward until it comes in contact with the conical collar 8 and the face of the shaft 3. The chuck 12 is then pushed back in its normal position as shown in Fig. 3, thereby clamping the wire securely between the inner surface of the chuck and the conical collar 8. This arrangement provides a positive gripping of the wire and materially contributes to the speed of manufacturing the grids since the chuck is operated by a simple sliding motion. The guiding and cutting mechanism attached to the shaft 18 is then brought into position shown in dotted line in Fig. 2, by releasing the knob 35 to allow the arm 19 to advance to its locked position. This is accomplished by means of the stationary pin 75 below the arm and the movable pin 34. The wire now lies along the upper surface of the mandrel and is grasped by the operator and bent at right angles to the casing and the chuck 12. In this position the wire lies in the guiding groove 25 on the plate 23. The operator then turns the lever 46 in a counter-clockwise direction and the train of gears operating through the pinion gear 4 and the cooperating action of the threaded portion 5 through the threads of the block 16, reciprocates the shaft and mandrel a predetermined number of turns to wind the wire on the mandrel as shown in Fig. 1. The spacing and the number of turns of the completed grid are determined by the pitch and number of threads on the shaft and the removable block. When the completed grid is wound the free end of the wire 52 is again bent at right angles so that it lies parallel to the mandrel 6. In this position the wire extends for a distance beyond the face of the plate 23 and a slight pressure applied to the handle 28 on the cutting arrangement 26 moves the knife edge 29 across the groove 24 to sever the wire. The mechanism attached to shaft 18 is again lowered by means of shifting the knob 35 to release the arm 19 and the chuck is slid along the mandrel 6 to release the completed grid.

Fig. 5 shows a completed grid after removal from the mandrel of the machine shown in Fig. 1, and embodies an electrode structure in which the number of turns are equally spaced apart, and the angular ends are formed to readily mount the electrode in an electron discharge device without any further adjustment or lining-up.

What is claimed is:

1. A grid winding machine comprising a casing, a threaded shaft in said casing, a rotatable mandrel carried by said shaft, wire receiving means carried by said mandrel, clamping means surrounding said receiving means and mandrel, and means to rotate and reciprocate said shaft.

2. A grid winding machine comprising a casing, a threaded shaft in said casing, a rotatable mandrel carried by said shaft, wire receiving means carried by said mandrel, clamping means surrounding said receiving means and mandrel, means to rotate said shaft and mandrel, an arm carried by said casing adjacent said mandrel, a guiding plate attached to said arm, and cutting means attached to said plate.

3. A grid winding machine comprising a casing, a threaded shaft in said casing, a rotatable mandrel carried by said shaft, wire receiving means carried by said mandrel, clamping means surrounding said receiving means and mandrel, means to rotate said shaft, an arm carried by said casing adjacent said mandrel, an adjustable plate attached to said arm, said plate having a groove through which said mandrel extends, and cutting means carried by said plate.

4. A grid winding machine comprising a casing, a threaded shaft in said casing, a rotatable mandrel carried by said shaft, wire receiving means carried by said mandrel, clamping means surrounding said receiving means and mandrel, means to rotate said shaft, a movable arm carried by said casing adjacent said mandrel, a plate attached to said arm, and guiding means on one side of said plate and a severing mechanism on the other side thereof.

5. A grid winding machine comprising a casing, a threaded shaft in said casing, a rotatable mandrel carried by said shaft, a conical collar on said mandrel, a split sleeve surrounding said mandrel, and a cylindrical chuck member enclosing said sleeve and slidably movable on said shaft.

6. A grid winding machine comprising a casing, a threaded shaft in said casing, means on said casing engaging said threaded shaft, a gear on one end of said shaft longitudinally movable coincident with said shaft, a mandrel carried on the other end of said shaft and slidable clamping means carried by said shaft and surrounding said mandrel.

7. A grid winding machine comprising a casing, a rotatable shaft in said casing, said shaft having a threaded portion intermediate its ends, a removable plate attached to said casing and having its inner surface threaded to engage said shaft, a mandrel on the other end thereof, and means to rotate said shaft to wind a helix on said mandrel.

8. A grid winding machine comprising a casing, a shaft, a mandrel, an operating handle, a train of gears between said handle and shaft, stopping means in the path of said handle, a movable arm projecting from said casing adjacent said mandrel, locking means on said casing, a lever carried by said arm and engaged by said locking means, and a plate carried by said arm, said plate having a groove in alignment with said mandrel and having guiding and cutting means thereon.

9. A grid winding machine comprising a casing, a shaft, a mandrel, an operating handle, a train of gears connecting said handle and shaft, stopping means in the path of said handle, and means whereby a clockwise turn of said handle rotates and advances said shaft and mandrel to a position to receive a wire to be wound, and a single counter-clockwise turn of said handle reverses the movement of said shaft and mandrel to wind a wire helix of a predetermined number of turns.

10. In combination, a wire winding mechanism, a rotatable mandrel, a split sleeve surrounding said mandrel, and a chuck member enclosing said sleeve and slidably movable on said mandrel.

11. In combination, a wire winding mechanism, a shaft, a rotatable mandrel, a chuck surrounding said mandrel and slidably carried by said shaft, and a slotted member between said chuck and mandrel.

In witness whereof, I hereunto subscribe my name this 21st day of August A. D., 1925.

EDWIN E. NEWTON.